United States Patent [19]

Hams

[11] 4,456,127
[45] Jun. 26, 1984

[54] DOCUMENT HANDLING MACHINE WITH TWO STAGE COLLECTION COMPARTMENT FOR GROUPING DOCUMENTS

[75] Inventor: Kenneth A. Hams, Easton, Pa.

[73] Assignee: Bell & Howell Company, Phillipsburg, N.J.

[21] Appl. No.: 297,536

[22] Filed: Aug. 31, 1981

[51] Int. Cl.³ .......................... B07C 3/02; B07C 5/38
[52] U.S. Cl. .................... 209/564; 209/569; 209/584; 209/900; 270/58
[58] Field of Search ............... 209/583, 584, 900, 539, 209/569, 563, 564; 270/32, 45, 46, 58; 271/189, 218

[56] References Cited

U.S. PATENT DOCUMENTS

| | | | |
|---|---|---|---|
| 3,374,902 | 3/1968 | Mills | 271/218 X |
| 3,459,300 | 8/1969 | McGuire | 209/900 X |
| 3,520,404 | 7/1970 | Pine | 209/563 X |
| 3,652,828 | 3/1972 | Sather et al. | 209/584 X |
| 3,654,040 | 4/1972 | Watson | 271/218 X |
| 4,014,784 | 3/1977 | Dunlap | 209/584 |
| 4,034,973 | 7/1977 | Hams | 270/58 X |
| 4,167,476 | 9/1979 | Jackson | 270/58 X |
| 4,273,319 | 6/1981 | Stocker | 270/58 X |
| 4,314,644 | 2/1982 | Stocker | 209/584 X |

Primary Examiner—Robert B. Reeves
Assistant Examiner—Edward M. Wacyra
Attorney, Agent, or Firm—Griffin, Branigan & Butler

[57] ABSTRACT

Rows (14, 16) of documents are conveyed in a shingled "two-up" fashion between low speed input rollers (18) and then to high speed rollers (22) which burst the shingled documents. After bursting, coded indicia (44) on each document are read by a photocell assembly (40). After bursting and reading, each document is individually folded in a folder (24). Documents are then delivered to a two-stage collector assembly (26). Documents having like indicia are passed through the collector assembly (26) to a lower collector stage (30). Upon bursting, documents whose indicia (44) indicate that they do not belong to a preceding group of documents are folded and then retained in an upper collector stage (28) until documents belonging to a preceding group of documents have been dumped on an insert track (32).

4 Claims, 12 Drawing Figures

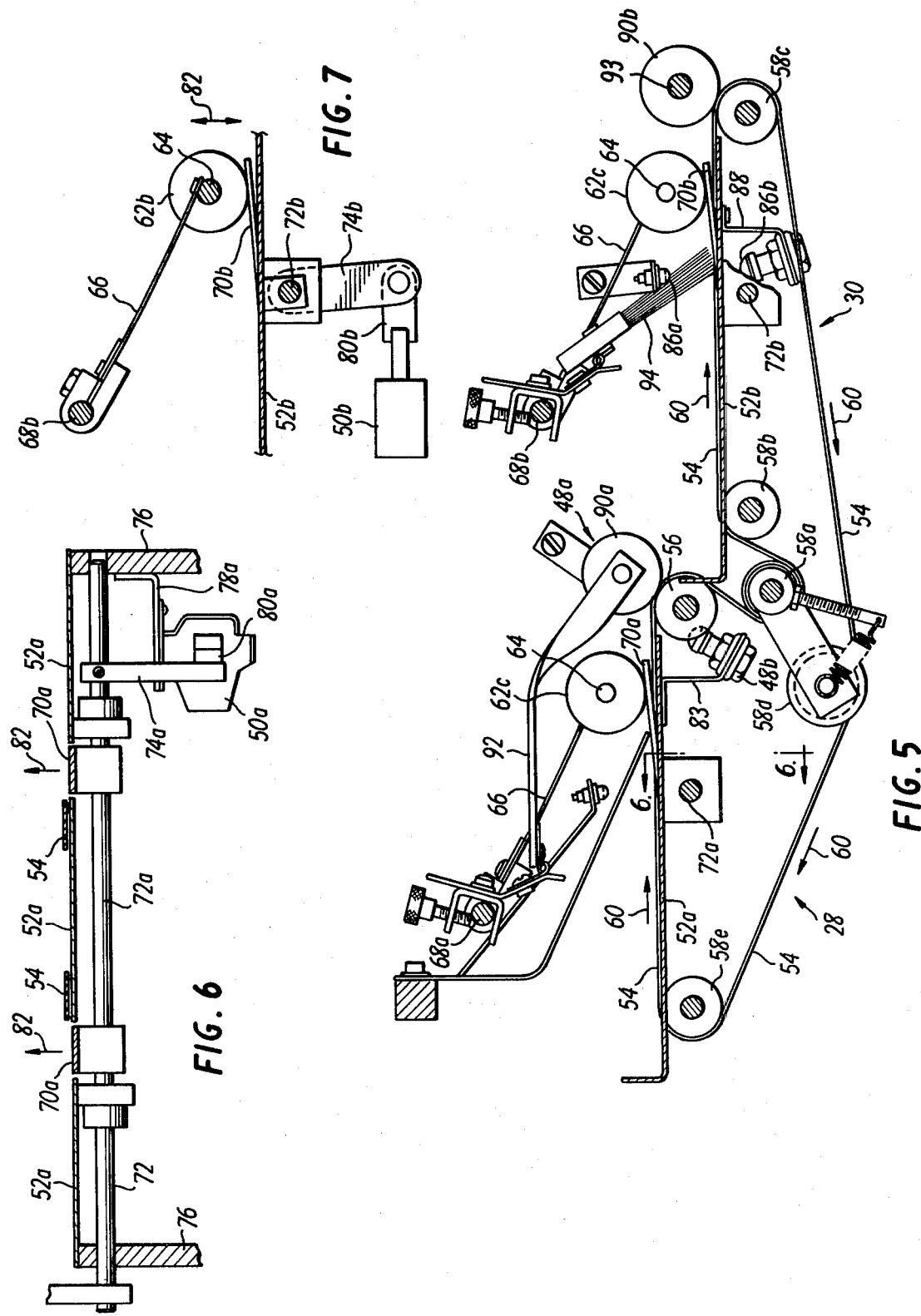

DOCUMENT HANDLING MACHINE WITH TWO STAGE COLLECTION COMPARTMENT FOR GROUPING DOCUMENTS

BACKGROUND

Mail and other document distribution machines frequently have folding stages following bursters. In such machines, however, the folding stage is frequently separated from the bursting stage by a registration stage therebetween. That is, documents that are to be folded together are collected at the registration stage after they are burst (or otherwise cut). When a given group of documents is gathered at the registration stage they are then moved onwardly to the folder and the next group of documents issues from the burster.

In the apparatus about to be described, however, documents are first slit into two strips, placed on top of one another in a "shingled" or staggered manner; and, delivered to a burster which alternately bursts upper and lower documents from the superimposed strips. Immediately upon leaving the burster, however, the documents are delivered directly to a folding stage without going through a registration stage. Consequently, it is often not possible to separate the documents to be folded into separate groups. This, however, is not satisfactory where, for example, each group of documents is subsequently intended to be placed in a separate envelope for mailing to a given customer or the like. It is an object of this invention, therefore, to provide an improved means for separating previously burst and folded documents into desired groups.

SUMMARY

Rows of documents are conveyed in a shingled "two-up" fashion between low speed input rollers and then to high speed rollers which burst the shingled documents. After bursting, a photocell assembly reads coded indicia, if any, on each document. After bursting and reading, each document is individually folded in a folder. Documents are then delivered to a two-stage collector assembly. Documents associated with a preceding group of documents are passed through the collector assembly to a lower collector stage. Upon bursting, documents whose indicia indicate that they do not belong to the preceding group of documents are folded and then retained in an upper collector stage until documents belonging to the preceding group of documents have been dumped on an insert track.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is a sectional view of FIG. 4 taken along the line 5—5;

FIG. 6 is a sectional view of FIG. 5 taken along the line 6—6;

FIG. 7 is a sectional view of FIG. 4 taken along the line 7—7;

DETAILED DESCRIPTION OF THE DRAWINGS

Figure 1:
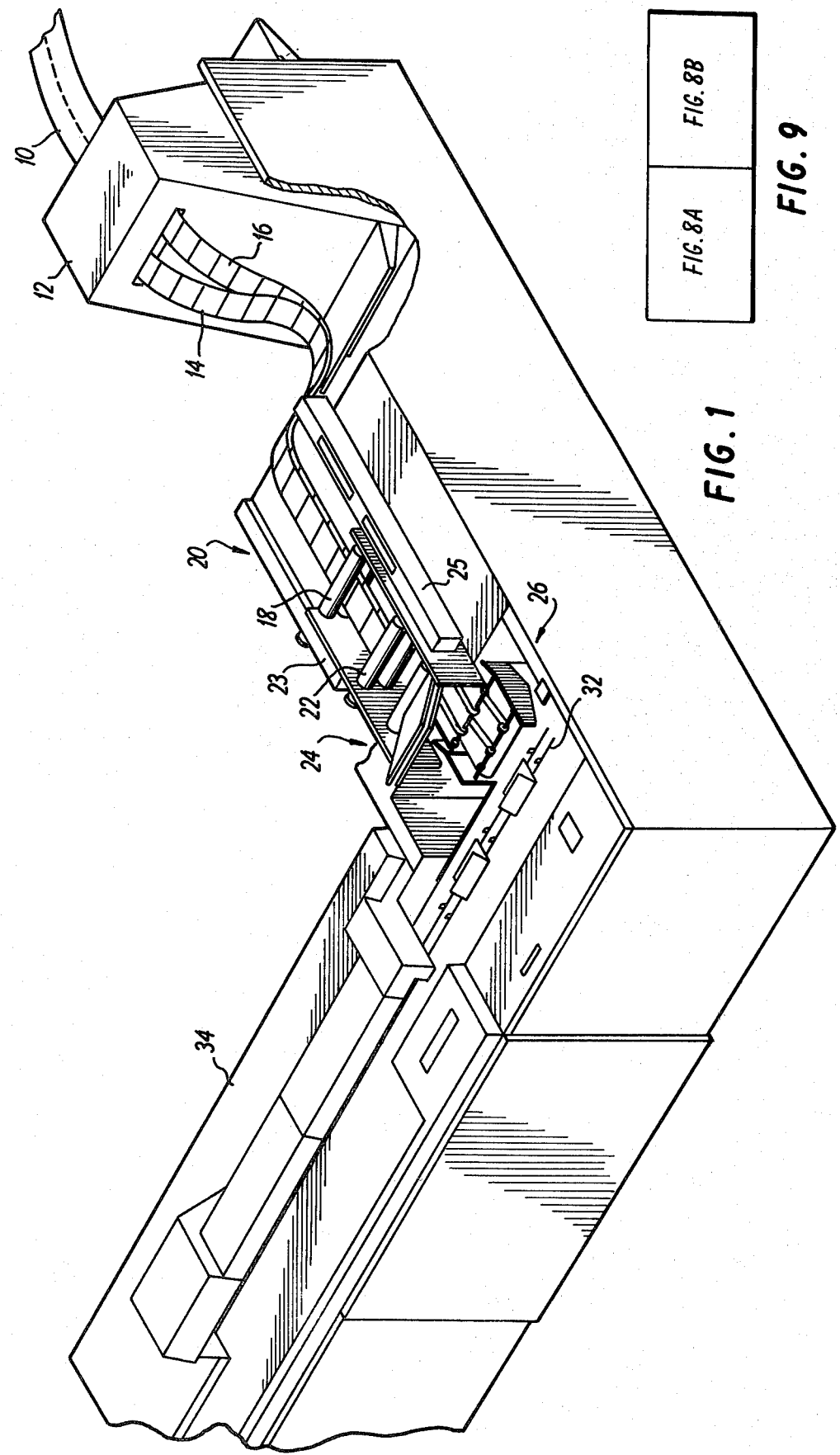
FIG. 1 is a perspective view of a document handling machine according to an embodiment of the invention.

The invention is typically used in connection with apparatus such as that which is illustrated in FIG. 1. Therein, a web or set of continuous-form documents 10 are fed into a splitter 12 where they are slit up the center into two separate portions or rows 14 and 16. The document portions 14 and 16 are then delivered in a shingled "two-up" fashion to low speed input rollers 18 of a burster 20. The shingled documents are then fed to high speed rollers 22 of the burster 20 which burst the shingled documents in a conventional manner.

In the above regard, the high speed rollers 22 on burster 20 usually run continuously and the low speed burster rollers 18 are run intermittently. The feed of the burster rollers are intermittent. The feed of the burster, therefore, is controlled by the low speed rollers 18 which often have a variable speed capability. In this respect, if a one-length separation between "one-up" documents is desired the low speed rollers 18 are generally set to a speed that is about one-half that of the high speed rollers 22. In order to obtain the same separation between shingled "two-up" documents, however, the low speed rollers 18 are run at only one-quarter of the speed of the high speed rollers 22. In this connection, a preferred embodiment employs a common D.C. driving source (not shown) for both the burster's rollers 18, 22 and the folder rolls, but the low speed rollers 18 are separately clutched and braked by a clutch and brake mechanism 25 with the speed thereof being varied by means of a variable sheave mechanism 23.

After the individual documents are burst by the high speed rollers 22, they are fed directly into a folding stage 24. In the embodiment illustrated, folding stage 24 is a buckle-type folder, such as that depicted in U.S. Pat. No. 3,915,446 to Boyer, incorporated herein by reference.

Figure 2:
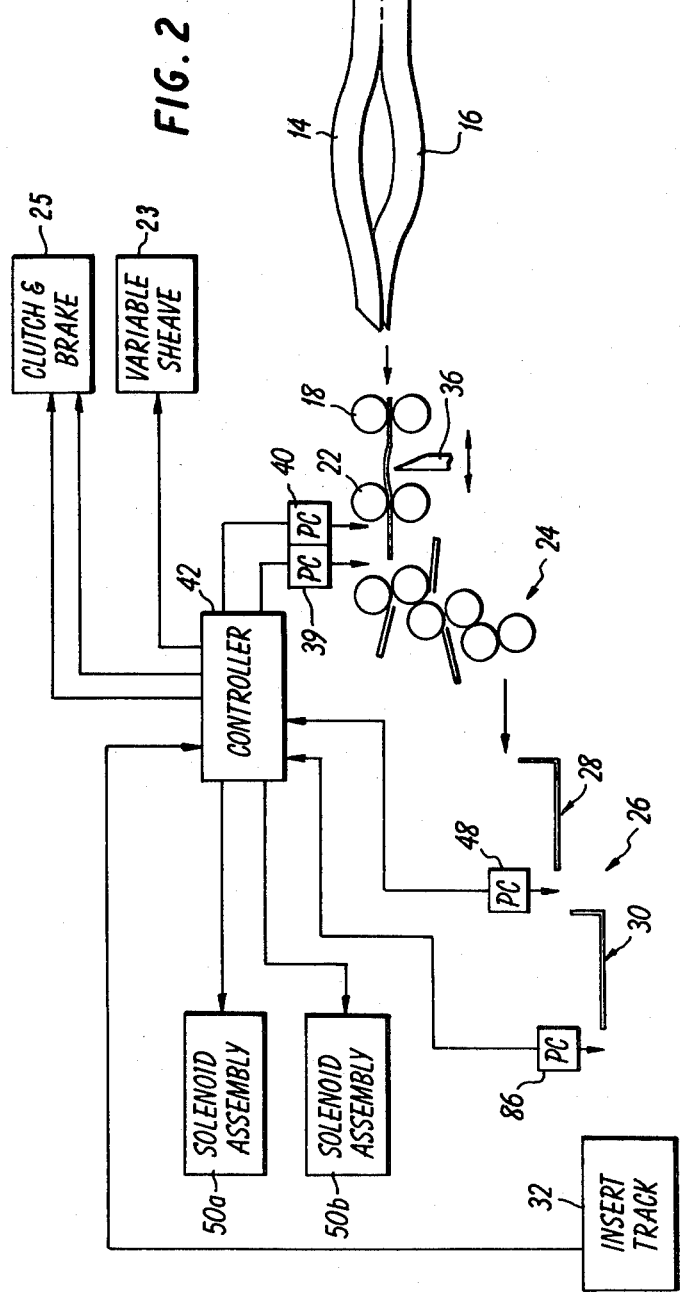
FIG. 2 is a schematic view of portions of a document handling machine.

After each document is individually folded in the folding stage 24, it is delivered to a two-stage collector assembly 26 having a first collector stage 28 (also referred to as an upper collector stage) and a second collector stage 30 as (also referred to as a lower collector stage or a final collector stage) generally illustrated in FIG. 2. In this regard, by means to be described shortly, all documents of a first group of documents travel through the first collector stage 28. Before the first of a next group of documents can be delivered to the first collector stage 28, all of the documents in the first collector stage 28 have been delivered to and are held in the second collector stage 30 for subsequent delivery as a group to an insert track 32. Insert track 32 moves the various groups of documents through an insertion machine 34 for subsequent mailing by means not shown.

Figure 3C:
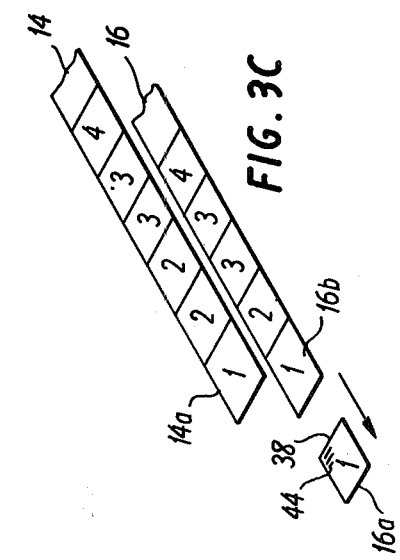
FIGS. 3A, 3B, and 3C are perspective views of the relative positioning of documents with respect to various stages of processing in a document handling machine.
Figure 3B:
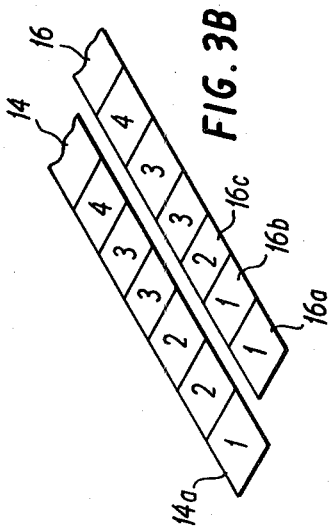
Figure 3A:
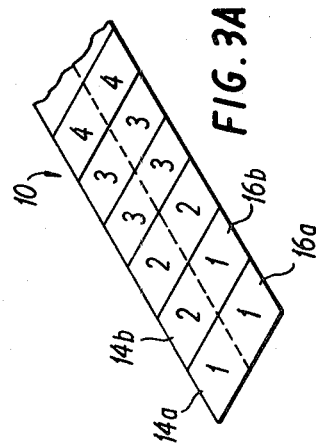

In the above regard, the continuous form 10 typically has documents printed thereon side-by-side as illustrated in FIG. 3A. Therein, a first customer's documents (such as computer-printed bills) are designated "1"; and a second customer's documents are designated "2"; a third customer's documents are designated "3"; and so on. When the form 10 is slit in the slitter 12, however, it emerges in a shingled "two-up" manner as illustrated in FIG. 3B. The first customer's document 16a is then fed by the burster folder's low speed rollers 18 over an adjustably located burster knife 36 (FIG. 2) into the high speed rollers 22 which burst document 16a from the lower strip 16 and separates document 16a as illustrated in FIG. 3C. At that time, the photocell assembly 39 in combination with a controller 42 detects certain characteristics of the document 16a by reading suitable indicia located in a field 44 thereon. Also, the trailing edge 38 of the document 16a (FIG. 3C) passes under a trailing-edge-detecting photocell assembly 40 as is schematically illustrated in FIG. 2.

After document 16a is delivered to the folder the next document 14a moves past the knife 36 and into the high speed burster rollers 22 for reading by the photocell assembly 39. It should be noted, in this regard, that the first customer's third document 16b is partially covered by the second customer's first document 14b and cannot be read by the photocell 39 until it is in the process of being burst by the high speed rollers 22 and on its way to the folding stages 24. Consequently, since the customary registration stage (between the high speed burster rollers 22 and the folder 24) is lacking, the first customer's last document (16b) and the second customer's first document (14b) cannot be separated prior to entry of document 16b into the folding stages 24. The separation of the two customers' documents, therefore, are separated prior to their passage onto the insert track 32, therefore, in a manner which will now be described.

As soon as the signals from the photocell assembly 39 are interpreted by the controller 42 to indicate that the first document 14b of the second customer has been burst, the controller 42 signals the clutch and brake mechanism 25 to stop the low speed rollers 18 which stops the feed of the second document (16c) of the second customer. The second customer's first document 14b however, continues through the folding stages 24 and is delivered to the first collector 28 where it is held by structure to be described shortly. In the meanwhile, the first customer's documents have all been fed directly through a first collector 28 and have been deposited in the second collector 30. In this respect, as soon as the controller 42 has determined that all of the first customer's documents have passed through a third photocell assembly 48 (comprising a phototransistor 48a and a radiant source, such as lamp 48b) the controller 42 sends a signal to a solenoid assembly 50 associated with the first collector 28 to stop subsequent documents from passing through the first collector 28 in a manner which will now be described.

Figure 4:
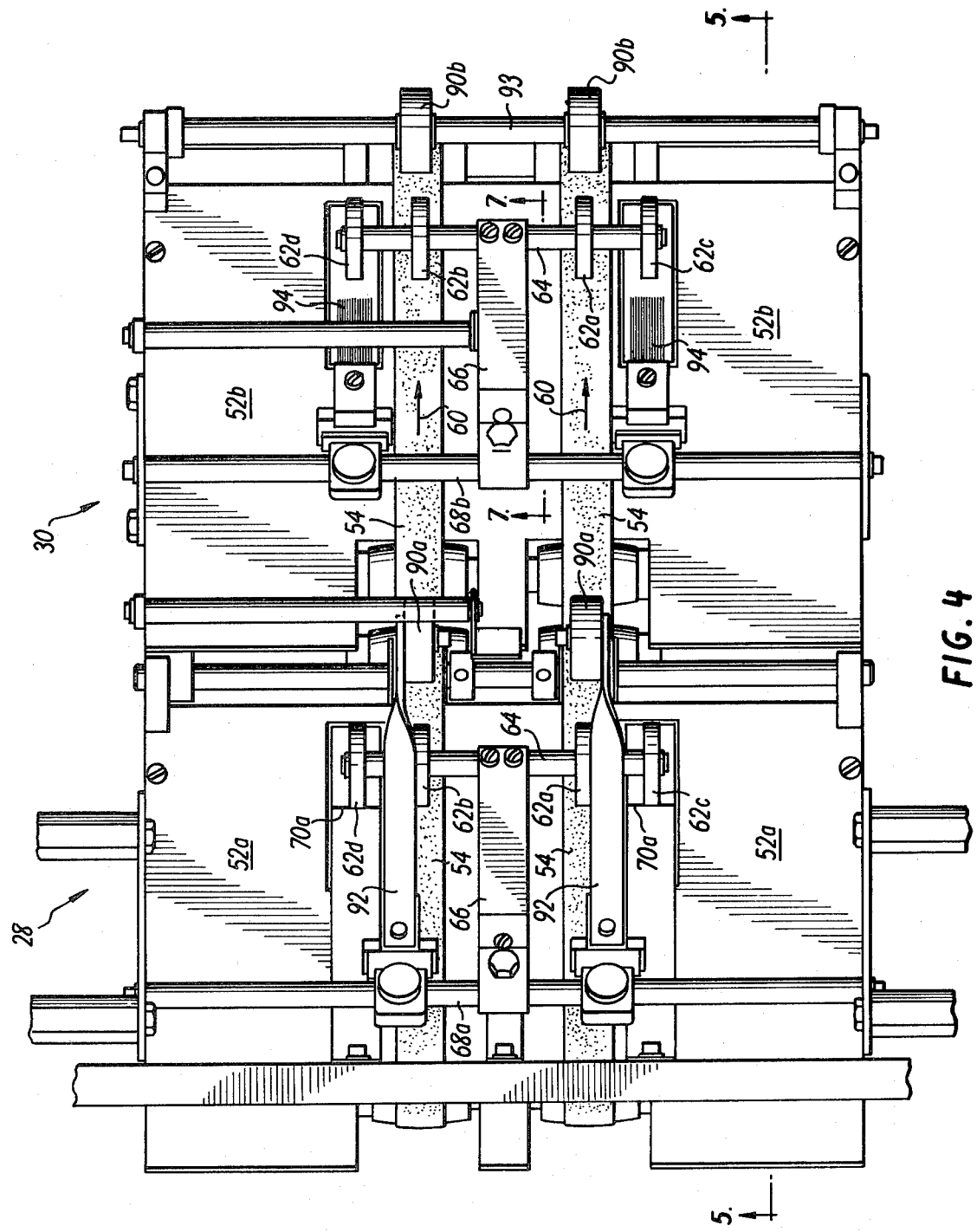
FIG. 4 is a plan view of a collector assembly of a document handling machine according to an embodiment of the invention.

As seen in FIGS. 4 and 5, collector assembly 26 comprises an upper collector stage 28 and a lower collector stage 30. Upper collector stage 28 and lower collector stage 30 have corresponding top plates 52a and 52b, respectively. Two webs or belts 54 are driven by drive rollers 56 over a series of rollers including tensioning rollers 58a and idle rollers 58b, 58c, 58d, and 58e. Each belt 54 travels over a portion of the top plates 52a and 52b, travelling in the direction of arrows 60 (See FIG. 5).

The collector assembly 26 comprises two sets of eject rollers 62 (each set comprising rollers 62a, 62b, 62c, and 62d). Each set of eject rollers 62 is mounted on an essentially straight shaft 64 which, in turn, has an intermediate portion thereof connected by appropriate fasteners to a first end of a roller extension arm 66. A second end of the roller extension arm 66 is adjustably secured to a rotatable shaft 68. In this regard, rotatable shaft 68a essentially extends across a portion of the width of the upper collector stage 28 and rotatable shaft 68b essentially extends across a portion of the width of the lower collector stage 30.

In the above regard, at each collector stage an innermost pair of rollers 62a, 62b selectively engages belts 54 travelling thereunder. That is, roller 62a selectively engages one belt 54 and roller 62b selectively engages the other belt 54. Also for each collector stage, an outermost pair of rollers 62c, 62d are selectively engaged by pairs of stop lifter fingers 70a, 70b associated with the upper collector stage 28 and the lower collector stage 30, respectively. Thus, two stop lifter fingers 70 are associated with each collector stage and, as seen in FIGS. 4 and 6, are located proximate the outside edges of the two belts 54.

The two stop lifter fingers 70 associated with each collector stage are secured to a rotatable stop lifter shaft 72. In this respect, stop lifter shaft 72a is associated with the upper collector assembly 28 and the stop lifter shaft 72b is associated with the lower collector assembly 30. In a similar fashion with respect to each collector stage, a bracket 74 connects the appropriate shafts 72 to the appropriate solenoid assembly 50. In this regard, solenoid assemblies 50 are attached to sidewalls 76 by mounting brackets 78 (see FIG. 6).

When a solenoid 50 is energized, the two stop lifter fingers 70 associated therewith lie essentially in the plane of top plate 52. However, when a solenoid 50 is not energized, a link rod 80 coupled to the solenoid travels in a direction out of the plane of the paper with respect to FIG. 6 and to the right with respect to FIG. 7. Motion of the link rod 80 causes bracket 74 secured thereto to rotate about the shaft 72. Since the stop lifter fingers 70 are secured to shaft 72, fingers 70 rotate upward (in the direction of arrows 82), thereby engaging the outermost pair of rollers 62c, 62d and causing the rollers 62c, 62d to be lifted above the belts 54.

As rollers 62c, 62d are being lifted above the belts 54, shaft 68 to which the rollers 62 are connected by extension arm 66 also rotates (in a counter-clockwise direction as seen in FIG. 5). Thus, the innermost pair of rollers 62a, 62b, are also lifted above the plane of the belts 54 so that the rollers 62a, 62b are no longer in contact with the belts. At that point, any document travelling through the collector stage is conveyed by the belts 54 up onto the elevated stop lifter finger 70 where the document becomes wedged between the stop lifter finger 70 and the outermost pair of rollers 62c, 62d. Thus, the document is prevented from leaving the collector stage until the solenoid assembly 50 is activated. Upon activation the stop lifter finger 70 is lowered to permit the document to be further transported by the belts 54.

The photocell assembly 48, comprising a phototransistor 48a and a source 48b, is positioned between the upper collector stage 28 and the lower collector stage 30. The source 48b is attached to the bottom of top plate 52a by a mounting bracket 83 affixed to suitable machine structure. The phototransistor 48a (hidden behind roller 90a in FIG. 5) is suspended above the source 48b by any suitable means connected to the machine structure. The photocell 48 is positioned so that a document leaving the upper collector stage 28 will interrupt the radiant energy beam of photocell 48.

A fourth photocell assembly 86, also comprising a phototransistor 86a and a source 86b, is positioned in the lower collector stage 30. In this regard, the source 86b is attached to the bottom of top plate 52b by a mounting bracket 88 and the phototransistor 86a is suspended above the top plate 52b. Source 86b and phototransistor 86a are positioned so that a document travelling along the belts 54 in lower collector stage 30 must interrupt the beam transmitted between the source 86b and the phototransistor 86a before being engaged by the stop lifter fingers 70b.

As illustrated in FIG. 5, two pairs of rollers 90 are suspended above the travelling belts 54. In this regard, rollers 90a are positioned above the drive rollers 56 so that after passing through the upper collector stage 28 the drive belts 54 pass between the drive roller 56 and the roller 90a. Each rotatable roller 90a is suspended from overhead machine structure by a bracket 92. The rollers 90b associated with the lower collector stage 30 are positioned at the end of the lower collector stage 30 so that upon completion of its travel through stage 30 each belt 54 passes between a roller 58c and a roller 90b suspended above the roller 58c. Unlike the rollers 90a, the rollers 90b are suspended above the collector assembly by a rotatable axial shaft 93 which is mounted to extend substantially across the width of the collector assembly 26.

A pair of brushes 94 are also securely suspended above the collector stage 30 and have bristles directed downwardly to selectively contact the stop lifter fingers 70b. Brushes 94 provide drag and control for documents traveling on the belts 54.

Figure 8A:
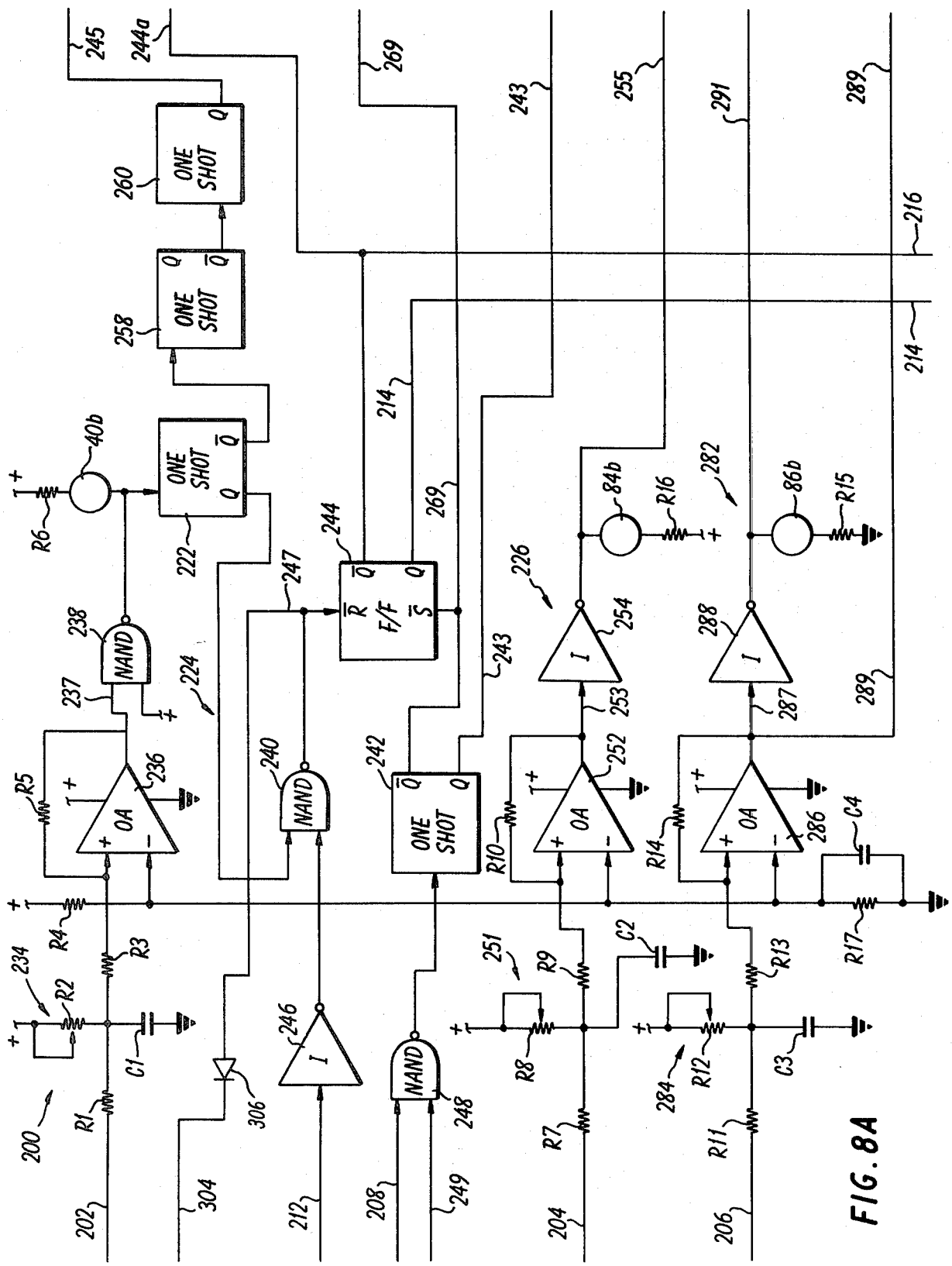
FIGS. 8A and 8B are schematic diagrams of circuitry included in a document handling machine; and, FIG. 9 is a schematic diagram showing the relationship of FIGS. 8A and 8B.
Figure 8B:
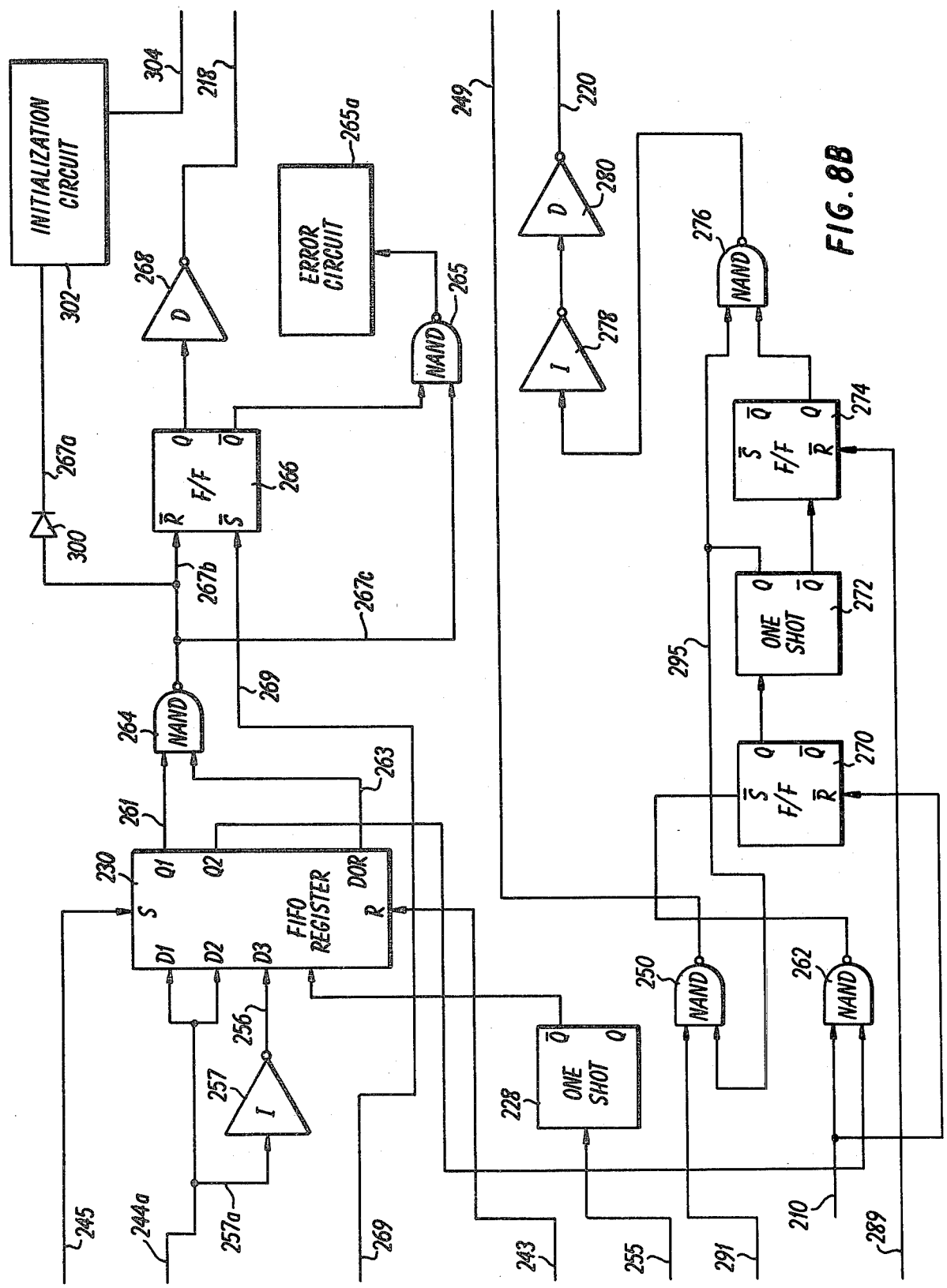

FIGS. 8A and 8B oriented in the manner of FIG. 9 are schematic diagrams of circuitry 200 included in a document handling machine, and particularly circuitry of the type included in the controller 42. The circuitry 200 receives a signal at lead 202 from the phototransistor 40a; a signal at lead 204 from the phototransistor 48a; and, a signal at 206 from the phototransistor 86a. The circuit 200 also receives a start-up enablement signal at lead 208 from an appropriate operator's console; a signal at lead 210 (see FIG. 8B) indicative of the status of the insert track 32; and, a signal at lead 212 generated by the photocell assembly 39 and indicative of whether a first document for a new customer has been recognized. In the latter regard, the signal at 212 is generated by the photocell assembly 39 and other suitable circuitry included in the controller 42, such as the circuitry disclosed in copending U.S. patent application Ser. No. 06/297,534 filed Aug. 31, 1981 by Hams.

The circuit 200 is connected to generate in appropriate instances signals at 214 and 216 which are ultimately applied to the brake and clutch mechanism 23 as hereinbefore discussed. Circuit 200 is also connected by a lead 218 to a solid state relay (unillustrated) which, in turn, is connected to the solenoid assembly 50a. Likewise, a connection at lead 220 leads via a solid state relay to the solenoid assembly 50b.

The circuit 200 includes: circuit elements adapted to determine when all documents in a preceding group of documents have passed from the intermediate collecting stage 28 to the final collecting stage 30; circuit elements adapted to communicate to the intermediate collecting stage 28 that all documents in a preceding group of documents have passed from the collecting stage 28 and that the intermediate collecting stage 28 may temporarily retain therein a subsequent document; circuit elements adapted to communicate to the intermediate collecting stage 28 the discharge of documents from the final collecting stage 30 and for enabling the intermediate collecting stage 28 to release any subsequent document retained therein.

Circuit elements adapted to determine when all documents in a preceding group of documents have passed from the intermediate collecting stage 28 to the final collecting stage 30 include first multivibrator means (such as trailing edge one-shot 222); gating means 224; detecting means 226 for detecting when a document has departed from the intermediate collecting stage 28; second multivibrator means 228; and, register means 230.

With regard first to the trailing edge one-shot 222, the phototransistor 40a is connected across a potentiometer bridge 234 to operational amplifier 236 (connected as a Schmidt trigger). The output terminal of the op amp 236 is applied via lead 237 to one input terminal of NAND gate 238, the other input to the NAND 238 being positively biased. The output terminal of the NAND 238 is connected to the trailing edge one-shot 222.

Gating means 224 of circuit 200 includes a NAND gate 240; a "start" multivibrator (such as "start" one-shot 242); and, a "burst" flip-flop 244. NAND gate 240 has a first input terminal connected to a Q output terminal of the trailing edge one-shot 222 and a second input terminal connected via an inverter 246 to lead 212. An output terminal of the NAND gate 240 is connected through a stop bus 247 to the reset terminal $\overline{R}$ of the burst flip-flop 244. The set terminal $\overline{S}$ of the burst flip-flop 244 is connected to a $\overline{Q}$ output terminal of the start one-shot 242. An input terminal to the start one-shot 242 is connected to NAND gate 248. As seen hereinafter a reset terminal R of a FIFO register is connected by a lead 243 to the Q output terminal of the one-shot 242.

The NAND gate 248 receives inputs from lead 208 (as described above) and from lead 249 (connected to NAND gate 250 as hereinafter described). A signal from the $\overline{Q}$ output terminal of the burst flip-flop 244 is applied on lead 216 to the clutch mechanism and a signal from the Q output terminal of the burst flip-flop 244 is applied on lead 214 to the brake mechanism as mentioned above.

The detecting means 226 of circuit 200 (which detects when a document has departed from the intermediate collecting stage 28) receives a signal on lead 204 from the phototransistor 48a and applies the same across a potentiometer bridge 251 to a first input terminal of an operational amplifier 252 (connected as a Schmidt trigger). The output terminal of the op amp 252 is connected by lead 253 to an inverter 254, whose output terminal in turn is connected by lead 255 to the one-shot 228.

Register means 230 is a first-in, first-out (FIFO) register which receives data input signals in accordance with a shift-in clock signal and which shifts signals thereon in accordance with a shift-out clock signal. Two input terminals D1 and D2 of the FIFO register 230 are connected by lead 244a to burst flip-flop 244; data input terminal D3 of the FIFO register is connected by lead 256 to an inverter 257 which in turn is connected via leads 257a and 244a to the flip-flop 244. These input data signals are clocked into the FIFO register 230 at its set terminal S on lead 245 by a signal triggered at the $\overline{Q}$ output terminal of the trailing edge one-shot 222. The signal is slightly delayed by two further one-shots 258 and 260 connected in series between the FIFO register 230 and the one-shot 222. A reset R terminal of the FIFO register 230 is connected by lead 243 to the Q output terminal of the "start" one-shot 242.

Output data is shifted through the FIFO register 230 by a shift-out pulse triggered from the $\overline{Q}$ output terminal of one-shot 228. An output data terminal Q1 of the FIFO register 230 is connected via lead 261 to circuit elements adapted to communicate to the intermediate collecting stage 28 that all documents associated with a preceding customer have passed from the collecting stage 28 and that the intermediate collecting stage 28 may temporarily retain therein a subsequent document. A second output data terminal Q2 of the FIFO register 230 is connected to NAND gate 262 as hereinafter described. A Data Out Ready (DOR) terminal of the FIFO register is connected by lead 263 to NAND gate 264.

The circuit elements adapted to communicate to the intermediate collecting stage 28 that all documents in a preceding group of documents have passed from the collecting stage 28 and that the intermediate collecting stage 28 may temporarily retain therein a subsequent document include NAND gate 264; multivibrator means (such as flip-flop 266); and, a driver 268. Leads 261 and 263 from the FIFO register are connected to the NAND gate 264. The output terminal of the NAND gate 264 is connected by lead 267a having a diode 300 thereon to an initialization circuit 302. The output terminal of the NAND 264 is also connected by lead 267b to the reset $\overline{R}$ terminal of the flip-flop 266, and further connected by lead 267c to an input terminal of NAND gate 265. The set terminal $\overline{S}$ of the flip-flop 266 is connected via lead 269 to the $\overline{Q}$ terminal of "start" one-shot 242. The Q output terminal of the flip-flop 266 is connected to the driver 268, which in turn is connected by lead 218 to the solid state relay and solenoid assembly 50a as described above. The $\overline{Q}$ terminal of the flip-flop 266 is connected to NAND gate 265. The output terminal of NAND gate 265 is connected to an error diagnostic circuit 265a.

In addition to being connected to the flip-flop 266 as indicated above, initialization circuit 302 is also connected to the flip-flop 244 through lead 304, diode 306, and stop bus 247. In this respect, diode 306 (like diode 300) has its cathode facing the initialization circuit 302 and serves to isolate the circuit 302 from any other change in signal applied to the flip-flop to which it is connected. Although not detailed as such in the drawings, the initialization circuit 302 comprises conventional elements suitable for holding a ground for a short period of time (approximately 50 milliseconds) on the flip-flops 266 and 244 to which the circuit 302 is connected.

Circuit 200 also comprises elements adapted to enable the final collecting stage 30 to discharge therefrom all documents belonging to a group of documents. Such elements include NAND gate 250; NAND gate 262; flip-flop 270; a 200 milli-second one-shot 272; flip-flop 274; NAND gate 276; inverter 278; driver 280; and, means 282 for detecting the presence of documents in the final collecting stage 30. In regard to the means 282, a signal on lead 206 from the phototransistor 86a is applied across a potentiometer bridge 284 to an operational amplifier 286 (connected as a Schmidt trigger). The output terminal of the op amp 286 is connected by lead 287 to an inverter 288 and by lead 289 to the reset $\overline{R}$ terminal of the flip-flop 274. The output terminal of the inverter 288 is connected by lead 291 to the NAND gate 250.

NAND gate 262 receives a first input from the Q2 output terminal of the FIFO register 230 and a second input on lead 210 indicative of the status of the insert track. The output of the NAND gate 262 is applied to the set terminal $\overline{S}$ of flip-flop 270 while the reset terminal $\overline{R}$ of flip-flop 270 receives the insert track signal on lead 210. The Q output terminal of the flip-flop 270 is fed to the 200 milli-second one-shot 272. A Q output terminal of the one-shot 272 is connected to a first input terminal of the NAND gate 250 and to an input terminal of the NAND gate 276. A $\overline{Q}$ output terminal of the one-shot 272 is connected to flip-flop 274. The reset $\overline{R}$ terminal of flip-flop 274 is connected by lead 289 to the output terminal of op amp 286 (connected as a Schmidt trigger). A Q output terminal of the flip-flop 274 is connected to a second input terminal of the NAND gate 276.

The output terminal of the NAND gate 276 is connected to the inverter 278. The inverter 278 is connected to the driver 280. The driver signal is then applied on lead 220 to the solid-state relay (unillustrated) and solenoid assembly 50b in the manner discussed above.

NAND gate 250, having input terminals connected to detecting means 282 and the one-shot 272, has its output terminal connected to one input terminal of the NAND gate 248.

Various resistances and capacitors illustrated in FIG. 8 are, in one embodiment, assigned the following preferred values:

| R1 = 1K | R5 = 220K | R9 = 10K | R13 = 10K |
|---|---|---|---|
| R2 = 100K | R6 = 1K | R10 = 220K | R14 = 220K |
| R3 = 10K | R7 = 1K | R11 = 1K | R15 = 1K |
| R4 = 10K | R8 = 100K | R12 = 100K | R16 = 1K |
| | | | R17 = 10K |

C1 = C2 = C3 = .022 F
C4 = .47 F

OPERATION

The operation of the collector assembly 26 will now be described with reference to the passage therethrough of documents such as those shown in FIG. 3C. For the sake of discussion, the document handling machine has just been started so that a high signal is applied on lead 208 to the NAND gate 248. NAND gate 248 is enabled and triggers one-shot 242 so that a high signal is applied to lead 243 and a low signal is applied to lead 269. The low signal on lead 269 is applied to the low-actuated set terminal $\overline{S}$ of the flip-flop 266 resulting in a high signal at the Q terminal of the flip-flop 266. Since the high signal from terminal Q of flip-flop 266 is applied to a driver 268 which inverts the signal, a low signal is applied at 218 to the solid state relay. Solenoid assembly 50a is thereby energized with the result that the stop lifter fingers 70a of the upper collector 28 lie essentially in the plane of the top plate 52a.

When one-shot 242 fires so that a low signal is applied to line 269, the low signal sets the low-activated flip-flop 244. As a result, a low signal is applied from the output terminal $\overline{Q}$ of the flip-flop 244 to the data input terminals D1 and D2 of the FIFO register 230. However, since the high signal on lead 243 has reset the FIFO 230, the FIFO DOR terminal puts a low signal on lead 263 so that NAND 264 remains enabled, the flip-flop 266 remains set, and the solenoid 50a remains energized.

Upon bursting of the first customer's first document 16a, the photocell assembly 39 reads the indicia 44 on the trailing edge 38 of the document, 16a. The phototransistor 40a is uncovered as the trailing edge 38 of document 16a passes through the photocell assembly 40. As explained in co-pending U.S. patent application Ser. No. 06/297,534 incorporated herein by reference, bursting of the first customer's first document 16a (or any other document having an indicia thereon indicating that the document is a first in a group of documents) causes a low signal to be applied on lead 212 to the circuit 200. The low signal on lead 212 is inverted by inverter 246 and applied to one of the input terminals of NAND gate 240.

As soon as the trailing edge 38 of the first customer's first document 16a has uncovered the photoresistor 40a of the photocell assembly 40, the photocell assembly 40 conducts a low signal which enters circuit 200 on lead 202 where it is amplified by operational amplifier 236. NAND gate 238 is thereby enabled. As the signal of NAND 238 goes from low to high, a high pulse is triggered at the output terminal Q of the trailing edge one-shot 222. The high pulse from the Q terminal of one-shot 220 is applied to an input terminal of the NAND gate 240. With high signals at both of its input terminals, the NAND gate 240 is disabled with the result that the stop bus 247 connected to the NAND gate 240 output terminal has a low value.

The low value on stop bus 247 is applied to the low-actuated reset terminal $\overline{R}$ of the burst flip-flop 244. Since the reset terminal $\overline{R}$ of the burst flip-flop 240 is low activated, a high value is produced at terminal $\overline{Q}$ and a low value is produced at terminal Q. These signals are applied through leads 216 and 214, respectively, to appropriate unillustrated circuitry to disengage the clutch and to activate the brake to stop the low speed burster rollers 18.

The high signal produced at terminal $\overline{Q}$ of flip-flop 244 is applied on lead 244a to data input terminals D1, D2, and D3 of the FIFO register 230, the signal being inverted by inverter 257 before being applied to terminal D3. The signals from the $\overline{Q}$ terminal of flip-flop 244 are clocked into the FIFO register 230 by a pulse received at the set terminal S of the FIFO register 230. This pulse was triggered as the phototransistor 40a was uncovered by the trailing edge of the first customer's first document 16a as it left the photocell assembly 40. In this regard, as the trail edge one-shot 222 produced a high pulse at its Q terminal, a low pulse at its $\overline{Q}$ terminal was also simultaneously produced and applied to one-shots 258 and 260 in series fashion to create the delayed shift-in clock pulse which is applied to the set terminal S of FIFO register 230.

When the high data signal is clocked into the FIFO register 230 in the above-described manner, the high signal immediately passes through the FIFO register 230 so that a high signal appears at FIFO output terminals Q1 and Q2. Thus, a high signal is applied from FIFO 230 terminal Q1 to the first input terminal of NAND gate 264 and from FIFO terminal Q2 to the NAND gate 262. Also, since valid data is now at the FIFO 230 output terminals, the DOR terminal of FIFO 230 is high, so that a high signal appears on lead 263 and is applied to NAND 264.

With a high signal on both leads 261 and 263, NAND gate 264 becomes disabled so that the signal on lead 267b goes low. A low signal on lead 267b resets the low-activated reset terminal $\overline{R}$ of flip-flop 266, so that the stop lifter fingers 70a rise above the plane of table top 52a (for reasons described above) and document is temporarily trapped in the upper collector stage 28.

When the first customer's first document 16a is trapped in the upper collector 28 and with the low speed burster rollers 18 stopped, the operator manually hits a switch which applies a high signal on line 208 to restart the machine. The one-shot 242 is triggered again in the manner described above. In this respect, when a low is applied on lead 269 to set flip-flop 266, solenoid 50a is energized so that the stop lifter fingers 70a fall back into the plane of the top plate 52a. With stop lifter fingers 70a in the plane of top plate 52a, the document 16a travels on the belt 54 and eventually leaves the upper collector stage 28.

As the document 16a leaves the upper collector section 28, it passes through the photocell assembly 48 and into the lower collector 30 wherein it is retained. In this respect, the solenoid assembly 50b of lower collector 30 remains deactivated so that stop lifter fingers 70b associated therewith remain uplifted to engage incoming documents until all documents associated with the customer are collected in the lower collector 30.

As the document 16a leaves the photocell assembly 48, the phototransistor 48a conducts a current so that a low signal is applied on lead 204 to the circuit 200. The low signal on lead 204 is amplified by the op amp 252 and inverted by the inverter 254. As the signal from inverter 254 goes high, it triggers a pulse from the $\overline{Q}$ terminal of the one-shot 228 which is used to clock out the high pulse in the FIFO register 230 associated with the first customer's first document 16a.

Soon after the low speed rollers 18 start up, the first customer's second document 14a is burst. Upon bursting, the trailing edge of the document 14a passes through and leaves photocell assembly 40, so that trailing edge one-shot 222 triggers a high signal at its Q terminal. This high signal from one-shot 222 is applied to one input terminal of NAND 240. Inasmuch as the indicia of the first customer's second document 14a indicates that the document 14a is not the first document of a new group of documents, the other input of the NAND 240 receives a low signal (since a high signal on the lead 212 is inverted by inverter 246). NAND 240 is enabled so that a high signal is applied to stop bus 247. The low-actuated reset terminal $\overline{R}$ of flip-flop 244 is unaffected by the high signal on stop bus 247, so that flip-flop 244 remains in its set state.

Being in its set state, the flip-flop 244 applies a low signal from its $\overline{Q}$ terminal to terminals D1 and D2 of the FIFO register 230. The data signals are clocked into the FIFO register 230 by a high signal arriving at set terminal S on lead 245 from the one-shots 222, 258, and 260. Hence, a low signal immediately appears at data output terminals Q1 and Q2 of the FIFO register 230 and corresponds to the first customer's second document 14a as the document 14a goes through the folder 24 and into the upper collector 28.

With the low speed rollers 18 still running, it is likely that one or more additional documents may be burst before document 14a clears the upper collector 28. This likelihood depends on certain factors, including the speed of the low speed rollers 18 and the size of the documents being handled. Suppose, for example, that the first customer's third document 16b and the second customer's first document 14b are burst before document 14a clears the upper collector 28. Since the first customer's third document 16b does not commence a new group of documents, the sequence of circuit values for document 14a would essentially be repeated for document 16b, with the result that FIFO register 230 would now have stored therein a low value corresponding to document 16b. The low value corresponding to document 16b would not yet appear at the FIFO register 230 output terminals, but would do so only after the low value corresponding to document 14a has been clocked out of the FIFO register 230.

When the second customer's first document 14b is burst, the photocell assembly 39 reads a new indicia on document 14b indicating that the document is for a new customer. As a result, lead 212 goes low. The signal on lead 212 is inverted at 246 and a high signal is applied to one input terminal of NAND gate 240. The other input terminal of NAND 240 also receives a high signal, since the trailing edge of document 14b leaving photocell assembly 40 triggers a high pulse at Q terminal of one-shot 222.

With both of its inputs being high, NAND gate 240 is disabled, resulting in a low signal on stop bus 247. The low signal on stop bus 247 is applied to the low-actuated reset $\overline{R}$ of burst flip-flop 244. As a result, a high signal appears at terminal $\overline{Q}$ of flip-flop 244. These signals are applied at 214 and 216 to the brake and clutch mechanism to stop the low speed burster rollers 18, and hence the webs 16 and 14.

The high signal from flip-flop 244 terminal $\overline{Q}$ is applied via lead 244a to FIFO register 230 input terminals and clocked in at set terminal S by a signal on lead 245 from one-shots 222, 258, and 260. Thus, the FIFO register 230 now has two values stored therein—a low value for document 16b (first customer's third) and a high value for document 14b (second customer's first)—and a low value (corresponding to the first customer's second document 14a) appearing at its data output terminals Q1 and Q2.

The low signal at FIFO 230 data output terminal Q1 is applied via lead 261 to one of the two input terminals to NAND gate 264. NAND gate 264 receives a high signal at its other input terminal by the lead 263. In this respect, the reset terminal R of the FIFO register 230 had been receiving a low value on lead 243 since one-shot 242 had long since fired and gone low. With reset terminal R of register 230 being low, and with valid data now appearing at the output terminals of the FIFO 230, the DOR terminal is high.

Accordingly, NAND gate 264 receives a low signal on lead 261 and a high signal on lead 263. Thus, the output of NAND 264 is high for each of the leads 267a, 267b, and 267c. A high on lead 267a has no effect, since it is applied to the anode of diode 300. Likewise, a high on lead 267c has no effect on NAND 265, which remains disabled.

In the above respect, since the low-actuated flip-flop 266 is unaffected by the high on lead 267b, the stop lifter fingers 70a of the upper collector 28 remain in the plane of table 52a. The document 14a thus is permitted to leave the upper collector 28 and to pass into the lower collector 30.

As the document 14a leaves the upper collector 28, it passes through the photocell assembly 48 and then into the lower collector 30. In leaving the photocell assembly 48, the document 14a uncovers the phototransistor 48a so that a low signal is produced on lead 204. As a result, op amp 252 goes low. The output signal of op amp 252 is inverted by the inverter 254 so that lead 255 carries a high signal to the one-shot 228. The signal change on lead 255 triggers a pulse from the one-shot 228.

The pulse of one-shot 228 is applied to an input terminal of the FIFO register 230 and serves as a clocking-out pulse. Thus, the first-in value in FIFO register (a low value corresponding to document 14a) is clocked out of the FIFO register 230. With the low value corresponding to document 14a clocked out of the FIFO register 230, the stored low value corresponding to document 16b immediately becomes available at the data output terminals Q1 and Q2.

The sequence of subsequent operations for document 16b resembles the previously-described sequence of operations for document 14a, since the value corresponding to document 16b and appearing at data output terminal Q1 of the FIFO register 230 is low. Thus, document 16b is permitted to leave the upper collector 28 since the stop lifter fingers 70a are still unelevated. However, when the document 16b passes through the photocell assembly 48 upon leaving the upper collector 28, the one-shot 228 is fired to clock out the low value appearing at FIFO register 230 output terminal Q1, leaving Q1 with a high value corresponding to the second customer's first document 14b.

The second customer's first document must be held in the upper collector 28 until all the first customer's documents have been collected in the lower collector 30 and deposited on the insert track 32. These operations are described in the following discussion.

When a high signal indicative of a new customer's first document appears at FIFO register 230 terminal Q1, NAND gate 264 is disabled since a high signal is also appearing on lead 263 connected thereto (as described above). Disablement of NAND 264 means that signals on leads 267a, 267b, and 267c go low. The low signal on lead 267b activates the low-actuated reset terminal $\overline{R}$ of flip-flop 266. As a result, with respect to the flip-flop 266, a low signal appears at output terminal Q and a high signal appears at output terminal $\overline{Q}$.

The low signal appearing at output terminal Q of flip-flop 266 is applied to driver 268, which inverts the signal and applies a high signal on lead 218 to a solid state relay. The solid state relay deenergizes the solenoid assembly 50a, so that the stop lifter fingers 70a are elevated above the plane of the table 52a to preclude the document 14b from continuing to travel along the belts 54.

At this point checks are preformed to determine whether the first customer's documents (now in lower collector 30) are to be discharged from the lower collector 30 and onto the insert track 32. The first check is to determine whether a subsequent customer's first document (such as document 14b in this example) is being retained in upper collector 28. A high value at FIFO register 230 output terminal Q2 indicates that such a document is being retained. This high value is applied to one of the two input terminals of NAND gate 262.

A second check is to determine whether an empty portion of the insert track 32 is currently at the exit from the lower collector 30. A high signal on lead 210, set during appropriate portions of the document handling machine's indexing cycle, indicates that insert track 32 is ready. The high signal on lead 210 is applied to the other input of the NAND gate 262, with the result that the output from NAND gate 262 goes low.

A third check is to determine whether the lower collector 30 actually has documents contained therein. In this respect, the photocell assembly 86 is blocked by documents 16a, 14a, and 16b, by any documents in the lower collector 30. For the example described, photocell assembly 86 is blocked, so that a low signal on lead 206 results, after inversion, in a high signal on lead 291. Lead 291 feeds one input terminal of NAND gate 250.

When NAND gate 262 goes low, a low-activated set terminal S̄ of flip-flop 270 is activated. As a result, a high signal produced at terminal Q of flip-lop 270 triggers a high pulse from terminal Q and a low pulse from terminal Q̄ of one-shot 272. The high pulse from one-shot 272 is applied via lead 295 to NAND gates 250 and 276.

The low pulse from one-shot 272 is applied to flip-flop 274. Flip-flop 274 goes high at terminal Q, and this value is applied to an input of NAND gate 276. Thus, NAND gate 276 receives high signals at both of its input terminals, meaning that the output of NAND gate 276 goes low. The low signal from NAND 276 is inverted by an inverter 278 to result in a high signal, which is in turn inverted by the driver 280 to be a low signal. The driver 280 applies the low signal on lead 220 to the solid state relay which, due to the low signal, energizes the solenoid asssembly 50b. Energization of the solenoid assembly 50b causes the stop lifter fingers 70b to rotate downwardly into the plane of the table 52b, so that the documents in the lower collector 30 may be deposited by the moving belts 54 onto the insert track 32.

Just before discharge of the documents in lower collector 30 onto the insert track 32, the NAND gate 250 receives high signals on both leads 291 and 295. As a result, NAND 250 is disabled so that a low signal is applied to lead 249. The low signal on lead 249 is applied to one input terminal of the NAND gate 248. Since the other input terminal of NAND 248 receives the high signal on lead 208, the output of NAND 248 goes high to trigger "start" one-shot 242. The triggering of "start" one-shot 242 causes the low speed burster drive rollers 18 to again start up and, as described hereinbefore, causes the energization of solenoid assembly 50a (since reset terminal R of FIFO register 230 is activated) so that document 14b released from the upper collector 28 and passed into the lower collector 30. Also, as hereinbefore mentioned with respect to the first customer's first document 16a, a high signal from "start" one-shot 242 terminal Q is applied to reset terminal R of FIFO register 230.

It should be understood that the document handling machine described herein can be easily adapted to handle rows of documents in which no two documents are to be grouped together. That is, each document is to be inserted in a unique envelope or the like. The adaptation can be made by setting a manual switch on a console to apply a high signal to one input terminal of a NAND gate (unillustrated), and connecting the other input terminal of the NAND gate to the Q terminal of the trailing edge one-shot 222. The output terminal of the unillustrated NAND gate is connected to the stop bus 241 which remains low for each document.

The document handling machine described herein can also be easily adapted to include a preset count stop function which would stop the document handling machine when a number of documents associated with one customer exceeds the number which the insert track 32 can handle. For this adaptation, the preselected maximum number is dialed on a thumbwheel switch on a control panel. Pulses from the trailing-edge one-shot 222 are fed to binary coded decimal counters (unillustrated). When the number of trail edge pulses (indicative of the number of documents) equals the preset number on the thumbwheel switch, a low signal is placed on the stop bus 241 and an error diagnostic message is generated.

While the invention has been particularly shown and described with reference to the preferred embodiments thereof it will be understood by those skilled in the art that various alterations in form and detail may be made therein without departing from the spirit and scope of the invention.

The embodiments of the invention in which an exclusive property or privilege is claimed are defined as follows:

1. A document handling machine comprising:
    separating means for separating documents from at least one row of documents;
    first detecting means for reading indicia on said documents after each document is separated from its row, said indicia providing an indication as to which group of documents a document belongs;
    collecting means through which said documents are transported after separations from their rows, said collecting means further comprising:
    an intermediate collecting stage through which all documents pass and wherein a document is temporarily retained if said document is not associated with a preceding group of documents; and,
    a final collecting stage for collecting documents belonging to said preceding group of documents;
    means for determining when all documents in said preceding group of documents have passed from said intermediate collecting stage to said final collecting stage;
    means for communicating to said intermediate collecting stage that all documents in said preceding group of documents have passed from said intermediate collecting stage and that said intermediate collecting stage may temporarily retain therein a subsequent document;
    means for discharging from said final collecting stage said preceding group of documents; and,
    means for communicating to said intermediate collecting stage the discharge of documents from said final collecting stage and for enabling said intermediate collecting stage to release any subsequent document temporarily retained therein.

2. The apparatus of claim 1, wherein said means for determining when all documents in said preceding group of documents have passed from said intermediate collecting stage to said final collecting stage includes an electrical circuit comprising:
    second detecting means for detecting an edge of a document after said document has been separated from its row;
    first multivibrator means triggered when said second detecting means detects an edge of a document;
    gating means for transmitting digital signals, said digital signals having a first value when said first multivibrator means is triggered and said first detecting means reads an indicia on a document dissimilar to indicia on preceding documents, said digital signals having a second value otherwise;

third detecting means for detecting when a document has departed from said intermediate collecting stage;

second multivibrator means triggered when said third detecting means detects the departure of a document from said intermediate collecting stage; and, register means for clocking in and clocking out on a first-in, first-out basis a plurality of digital signals from said gating means, said register means adapted to clock in a digital signal from said gating means when said first multivibrator is triggered and adapted to clock out a digital signal when said second multivibrator is triggered.

3. The apparatus of claim 2, wherein said means for communicating to said intermediate collecting stage that all documents in said preceding group of documents have passed from said intermediate collecting stage and that said intermediate collecting stage may temporarily retain therein subsequent document comprises:

third multivibrator means triggered upon the clocking out by said register means of a digital signal having said first value;

first relay means responsive to the triggering of said third multivibrator means; and, first solenoid means energized by said first relay means.

4. The apparatus of claim 2, wherein said means for discharging from said final collecting stage documents in said preceding group of documents include an electrical circuit comprising:

fourth detecting means for detecting when documents are contained in said final collecting stage;

second gating means for transmitting digital signals having a first value when said fourth detecting means indicates that documents are contained in said final collecting stage and said register means clocks out a digital signal of said first value, said digital signals having a second value otherwise;

second relay means responsive to said digital signal of said second gating means when said signal is of said first value; and, second solenoid means energized by said second relay means.

* * * * *